United States Patent
Zabrosky

(10) Patent No.: US 9,498,829 B2
(45) Date of Patent: Nov. 22, 2016

(54) DRILLING SYSTEM FOR DEEP HOLES

(71) Applicant: Allied Machine & Engineering Corp., Dover, OH (US)

(72) Inventor: Jared R. Zabrosky, New Philadelphia, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 227 days.

(21) Appl. No.: 13/787,338

(22) Filed: Mar. 6, 2013

(65) Prior Publication Data

US 2014/0255115 A1    Sep. 11, 2014

(51) Int. Cl.
*B23B 51/02* (2006.01)
*B23B 51/04* (2006.01)
(Continued)

(52) U.S. Cl.
CPC ........... *B23B 51/02* (2013.01); *B23B 51/0054* (2013.01); *B23B 51/0493* (2013.01); *B23B 51/06* (2013.01); *B23B 2200/208* (2013.01); *B23B 2205/04* (2013.01); *B23B 2231/0268* (2013.01); *B23B 2240/04* (2013.01); *B23B 2251/02* (2013.01); *B23B 2260/124* (2013.01);
(Continued)

(58) Field of Classification Search
CPC ...................... B23B 51/0493; B23B 2200/208; B23B 2205/04; B23B 2231/0268; B23B 2240/04; B23B 2251/02; B23B 2260/124; B23B 51/0054; B23B 51/02; B23B 51/06; Y10T 408/455; Y10T 408/5583; Y10T 408/89

USPC ............ 408/713, 238, 239 R, 227, 228, 229, 408/230, 231, 232, 233, 59, 57, 56
See application file for complete search history.

(56) References Cited

U.S. PATENT DOCUMENTS 6,012,881 A    1/2000 Scheer
6,059,492 A    5/2000 Hecht
(Continued)

FOREIGN PATENT DOCUMENTS

DE         94340      9/1896
DE        4015514    12/1990
(Continued)

*Primary Examiner* — Eric A Gates
*Assistant Examiner* — Paul M Janeski
(74) *Attorney, Agent, or Firm* — Hahn Loeser+ Parks LLP; Scott M. Oldham, Esq.

(57) ABSTRACT

The invention is directed to a drill system that better uses the power curve of modern machine tools. The drill system uses a two-step drill, utilizing IC inserts to perform the major hole diameter cutting, and a central drilling system. In examples, the IC inserts can be set in a drill head in a single or double effective configuration. A central drilling system cuts the remaining minor diameter portion of the hole, and is configured to see less cutting surface footage, due to its position from the rotating center of the tool. The central drilling system may include a "self-centering" geometry, such that the drill head of the tool with be guided throughout the depth of the hole. The drill system allows for a large diameter deep hole that remains straight throughout to be drilled at higher speed and lighter feed rates thus offering a more productive tool that takes advantage of the power curves and lower thrust capabilities of modern machine tools.

20 Claims, 5 Drawing Sheets

(51) Int. Cl.
  *B23B 51/00*   (2006.01)
  *B23B 51/06*   (2006.01)

(52) U.S. Cl.
  CPC ....... *Y10T 408/455* (2015.01); *Y10T 408/5583* (2015.01); *Y10T 408/89* (2015.01)

(56) References Cited

U.S. PATENT DOCUMENTS

| | | |
|---|---|---|
| 6,485,235 B1 | 11/2002 | Mast et al. |
| 6,506,003 B1 * | 1/2003 | Erickson ..................... 408/226 |
| 6,984,094 B2 | 1/2006 | Nuzzi et al. |
| 7,201,542 B2 | 4/2007 | Fritsch et al. |
| 7,309,196 B2 | 12/2007 | Ruy Frota de Souza |
| 7,556,458 B2 | 7/2009 | Heilmann et al. |
| 7,575,400 B2 | 8/2009 | Kruszynski et al. |
| 8,317,438 B2 | 11/2012 | Mergenthaler |
| 8,376,669 B2 | 2/2013 | Jaeger et al. |
| 8,419,322 B2 | 4/2013 | Hodza et al. |
| 8,449,227 B2 | 5/2013 | Danielsson |
| 8,721,235 B2 | 5/2014 | Kretzschmann et al. |
| 2008/0304928 A1 * | 12/2008 | Engstrom et al. ............ 408/229 |
| 2009/0044986 A1 * | 2/2009 | Jaeger et al. ................ 175/418 |
| 2010/0322731 A1 * | 12/2010 | Aare ............................ 408/226 |
| 2011/0110739 A1 * | 5/2011 | Frisendahl .......... B23B 31/1076 408/200 |
| 2011/0250028 A1 | 10/2011 | Zimmerman et al. |
| 2012/0134759 A1 | 5/2012 | Jaeger et al. |

FOREIGN PATENT DOCUMENTS

| | | |
|---|---|---|
| JP | 2004276136 | 10/2004 |
| WO | 02076661 | 10/2002 |

* cited by examiner

FIG. 7
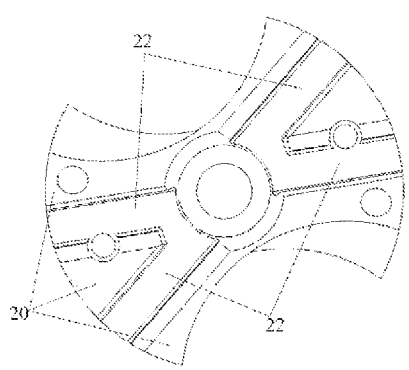
FIG. 8
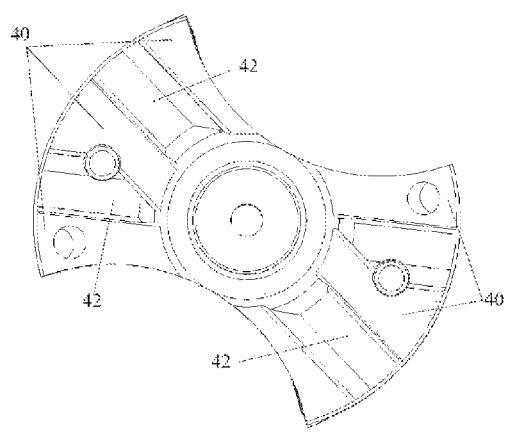
FIG. 10a
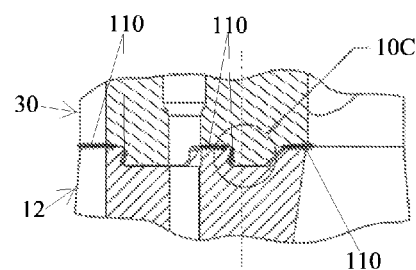
FIG. 10b
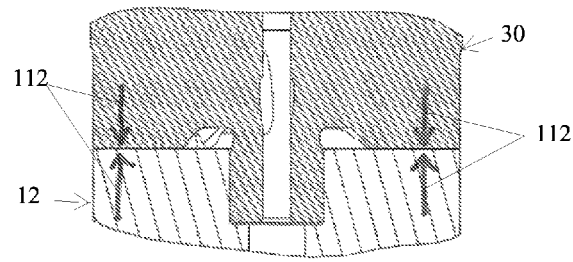
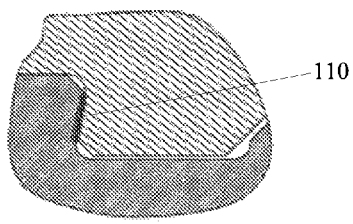
FIG. 10c FIG. 11a
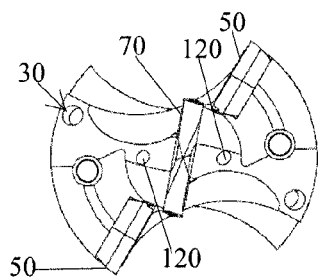
FIG. 11b
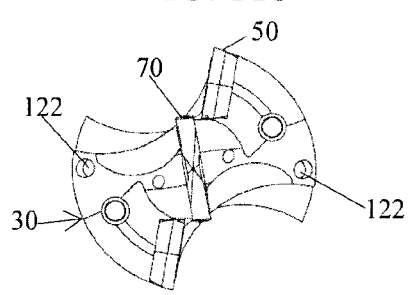
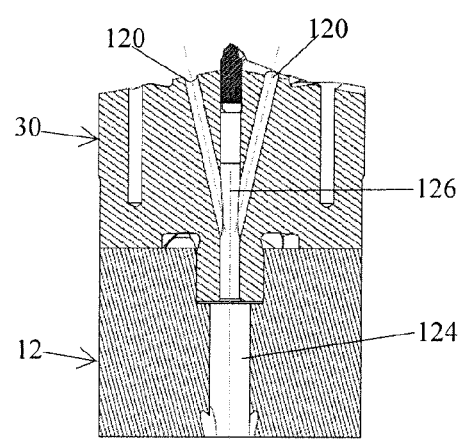
FIG. 11c
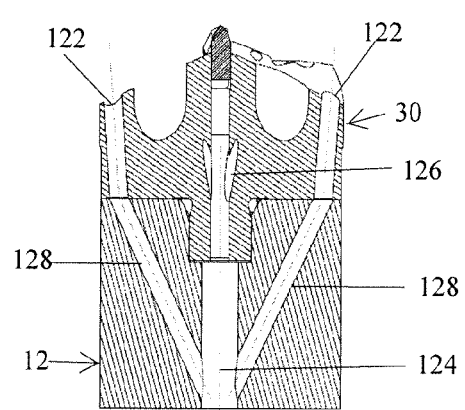
FIG. 11d
FIG. 12a
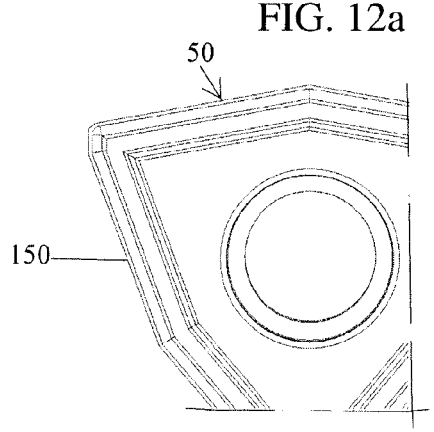
FIG. 12b
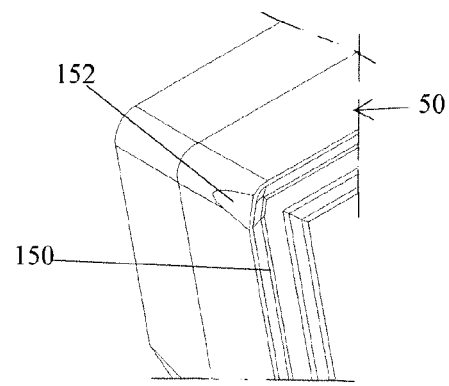

DRILLING SYSTEM FOR DEEP HOLES

BACKGROUND OF THE DISCLOSURE

In deep hole drilling systems, modern machine tools have led to the need for tooling that can effectively produce holes with a large depth to diameter ratio.

For making large diameter deep holes, the tooling that has been used does not account for using modern machine tools with less available horsepower. The machine tools that are found in use today generally have less available horsepower and can only reach that available peak horsepower at high spindle speeds. Conventional deep hole drilling may utilize double effective cutting geometry where both edges share an equal amount of the cutting load. This type of geometry allows for a drill to establish a centerline and act as a guide for the rest of the drill body following it. This enables longer drill bodies to drill straighter holes without leading off of centerline. In order to achieve chip formation in a way that chip evacuation at depth is manageable, these types of drill would need to be run at heavy feed rates in order to segment the chips. Furthermore, the drill would require being rotated at a relatively low spindle speed to manage the heat at the OD of the tool.

Another style of deep hole drilling that may be utilized is single effective gun drills or ejector head drilling tools. These types of tools are more suited to higher depth to diameter ratios and often require special machines and set-ups to be effective. These types of tools may also utilize a bearing surface on the tool body to attempt to provide stability to the front of the drill by making contact with the inside wall of the hole just previously drilled. This technology is widely used throughout the industry to attempt to provide stability to longer drills or to attempt to keep them drilling on center. It would be desirable to provide tooling that allows simple and flexible set-ups and use of standard machine tools.

Attempts to use a large spade blade to drill deep holes have also been pursued. However, these tools run at lower speeds and higher feed rates. Lower speeds mean that the machine is operating at the lower portion of the machines power curve. Higher feed rates require more thrust which may not be available on modern drilling machines. Indexable Carbide (IC) drills may be used to drill holes at high spindle speeds and lesser feeds. An IC drill will consume less thrust and will run at the higher end of the power curve relative to a spade drill of the same diameter. However at depths greater than 4×Diameter, IC drills lack stability and tend to lead off center which produces a hole that may not meet straightness requirements. Indexable inserts are available in various shapes and have the ability to be rotated (or indexed) to a fresh cutting edge when worn, and eventually replaced. This offers the ability to reuse the tool body any number of times by replacing the worn inserts. The drill body includes pockets to position the inserts by means of a screw or mechanical clamping mechanism. The position of the pocket on the cutting end of the drill body determines the size of the hole to be drilled. These types of drills are considered single flute effective, meaning that the inserts overlap. One insert cuts a portion of the diameter from the major diameter in towards the centerline and the other inserts cut the remaining portion from the centerline out to the point where it overlaps with the other insert.

There is a need to provide tooling that allows for utilizing the power curve of the modern machine tools, while accommodating the desire to drill at higher speed rates and lighter feed rates, but ultimately higher penetration rates.

SUMMARY OF THE DISCLOSURE

The invention is therefore directed to a drill system that better uses the power curve of the modern machine tools. The drill system uses a two-step drill, utilizing IC inserts to perform the major hole diameter cutting, and a central drilling system. In examples, the IC inserts can be set in a drill head in a single or double effective configuration. A central drilling system cuts the remaining minor diameter portion of the hole, and is configured to see less cutting surface footage, due to its position from the rotating center of the tool. The central drilling system may include a "self-centering" geometry, such that the drill head of the tool with be guided throughout the depth of the hole. The drill system allows for a large diameter deep hole that remains straight throughout to be drilled at higher speed and lighter feed rates thus offering a more productive tool that takes advantage of the power curves and lower thrust capabilities of modern machine tools.

In another aspect of the drilling system, both the indexable IC inserts and central drilling system provide the flexibility of being able to have different cutting geometries to suit a users application, with various options available with the IC inserts and central drilling system. Each geometry can be suited to a specific material and/or application, thereby increasing the effectiveness of the system. In another aspect, additional economy and flexibility may be provided by a range of fixed diameter heads that fit on the same holder body, which provide the user the ability to drill multiple sized holes without the purchase of additional holder bodies.

A drilling system according to an example of the present invention is disclosed comprising a holder body and a drill head attachable to the holder body, with the holder body having a first mating surface. The drill head in turn has a second mating surface that engages the first mating surface of the holder body. One of each of the first and second mating surfaces include at least one dovetail protrusion and at least one dovetail groove respectively. In a further example, a plurality of dovetail protrusions and a plurality of dovetail grooves may be used, each of which is formed in a rotational pattern about the center axis of the tool. A central positioning system may be provided to allow alignment of the drill head to the holder body. The drill head is assembled to the holder body rotating the drill head about the axis of the tool, in the direction of tool rotation (clockwise), until the at least one dovetail protrusion engages with the at least one dovetail groove and locks the drill head into place in association with the holder body.

In an example, the at least one dovetail protrusion and groove are together designed to absorb the cutting forces during a drilling operation in two directions. The first and second mating surfaces of drill head and holder body together translate the axial force from drill head to body. The at least one dovetail groove and dovetail protrusion formed on one of the first and second mating surfaces respectively include surfaces that translate the rotational force from drill head to the holder body. These surfaces of the at least one dovetail groove and dovetail protrusion may be angled to oppose lateral loads from drilling forces.

BRIEF DESCRIPTION OF THE DRAWINGS

FIG. 7 is a top view of the top surface of the holder body of this example of the drilling system;

FIG. 8 is a bottom view of the bottom surface of the drilling head of this example of the drilling system;

FIGS. 10a-10c show partial cross-sectional views of the connection between the drill head and holder body of this example of the drilling system;

FIGS. 11a-11d show partial sectional views of the coolant supply systems of this example of the drilling system; and FIGS. 12a and 12b show partial elevational views of a cutting insert associated with the drilling system.

DETAILED DESCRIPTION OF THE DRAWINGS

Figure 1:
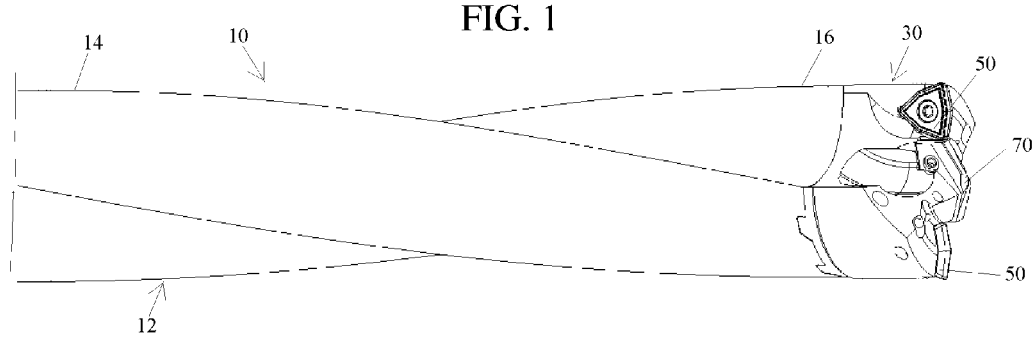
FIG. 1 is a partial perspective view of a drilling system according to an example of the present disclosure.

Referring now to FIG. 1, an example of the drilling system 10 of the invention may include a holder body 12 with shank end 14 to connect with the machine tool and a head end 16. The length of this body 12 will be the determining factor of the depth of hole to be drilled. In the example shown, the holder body has two flutes to evacuate chips of material from the double effective cutting geometry of the drill head 30. The drill head 30 in this example is assembled to the end of the holder body 12. The drill head 30 supports and positions a plurality of indexable inserts 50 and a central drilling system 70, that together perform the cutting action. Drill heads 30 of different major diameter and cutting configurations can be assembled to the holder body 12, allowing for significant flexibility in allowing different cutting geometries to suit the application. Both the inserts 50 and central drilling system 70 can be changed out of the drill head 30 based on the materials and/or application of the user. The replaceable nature of the indexable inserts 50 and the central drilling system 70 that can be assembled to the drill head 30 allow the user to specify the type of geometry to be used in each insert based on the application. Each geometry can be suited to a specific material and/or application thereby increasing the effectiveness of the system 10. Additionally, further economy and flexibility is provided by having a range of fixed diameter drilling heads 30 that fit on the same holder body 12, to provide the user the ability to drill multiple sized holes without the purchase of additional bodies.

Figure 2:
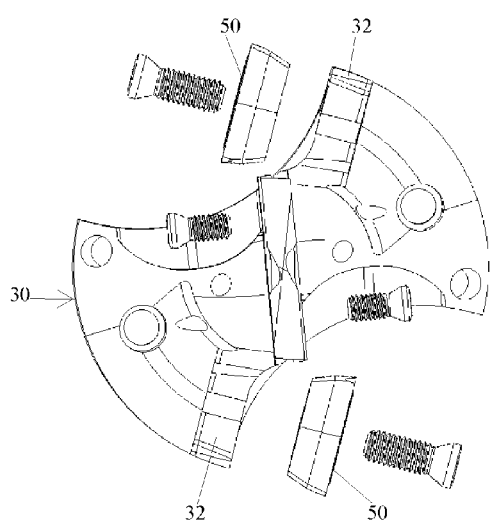
FIG. 2 is an exploded top elevational view of the drilling head associated with the drilling system.
Figure 3:
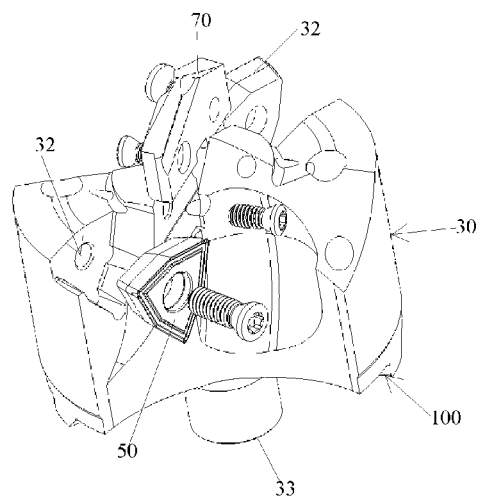
FIG. 3 is an exploded perspective view of the drilling head of FIG. 2.
Figure 4:
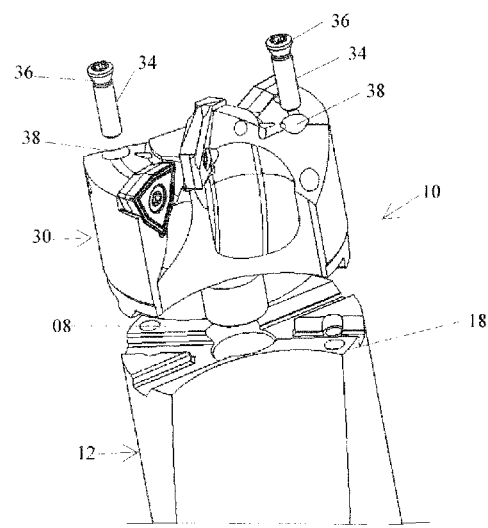
FIG. 4 is an exploded perspective view of the drilling head and holder body of the drilling system.
Figure 5:
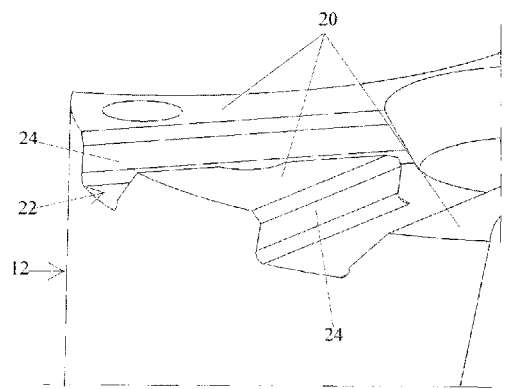
FIG. 5 is a partial perspective view of the top surface of the holder body of this example of the drilling system.
Figure 6:
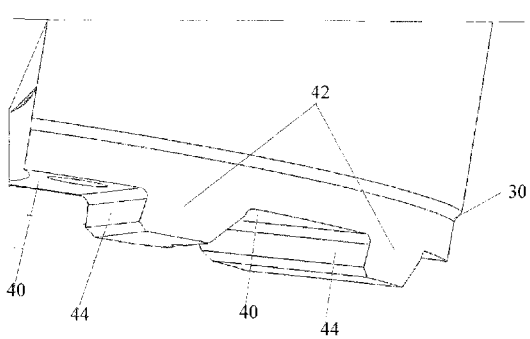
FIG. 6 is a partial perspective view of the bottom surface of the drilling head of this example of the drilling system.

To further refine the system 10 in this example, the drill heads 30 are made to fit like sized bodies 12 with a predetermined interface 100 designed for that drill diameter range. As seen in FIGS. 2 and 3, all IC cutting inserts 50 as well as the central drilling system 70 are assembled to the drill head 30. The central drilling system 70 can be a replaceable blade style or replaceable tip drill style, and is assembled with the mechanical means of assembly for that style and having the features to locate the central drilling system 70 in a predetermined position as part of the drill head 30. The drill head 30 further includes pockets 32 to position the IC inserts 50 in the proper position to perform the major diameter cutting. The IC inserts 50 may mechanically fastened into the pockets 32 in precise position for cutting the outside diameter of the desired hole. The drill head 30 may include a center guide post 33. In an example, the drill head 30 is then assembled to the body 12 and fastened using torx driven screws 34 with conical shaped heads 36, as shown in FIG. 4. The axis of the mounting screw hole 18 in the holder body is designed to line up with the axis of the mounting screw hole 38 in the drill head in such a way that, when tightened, the conical seat of the screw head 36 will influence the drill head 30 to rotate about its center axis in the direction of tool rotation until the connection 100 engages the holder body 12.

Referring to FIGS. 5-8, the connection 100 between drill head 30 and body 12 is shown in more detail, and is designed to connect the drill head 30 and body 12 in a manner to more effectively absorb the cutting forces during a drilling operation, and more particularly, the cutting forces in two directions. As seen in FIGS. 7 and 8, the surface that translates the axial force from drill head 30 to body 12 is the flat face 20 of the body 12, and the flat surface 26 on the bottom of the drill head 30. In the surface 20 of the body 12, dovetail grooves 22 are formed and correspondingly, dovetail protrusions 42 are formed in the drill head 30. The surfaces that translate the rotational force from drill head 30 to body 12 are the faces 24 of the dovetail grooves on the body 12 and the faces 44 of the dovetail protrusions 42 on the drill head 30. In this example, at least one dovetail groove 22 and at least one dovetail protrusion 42 may be provided, and a plurality of dovetail grooves 22 and dovetail protrusions 42 may be used as shown, disposed on opposing sides of the mating surfaces 20 and 40. It may be possible to form the dovetail groove(s) 22 and/or dovetail protrusion(s) 42 on either one of mating surfaces 20 and 40. In the example, symmetrical positioning of the grooves and protrusions is shown, providing balanced and effective absorption of the drilling loads. On each side of the interface 100, there may be provided two grooves 22 on the body 12 and two interfacing protrusions 42 on the drill head 30. All other surfaces of this interface are clearance. The interface of this example connection 100 is symmetrical which will allow for the head to be assembled successfully at 180° increments or other suitable increments for example.

Figure 9A:
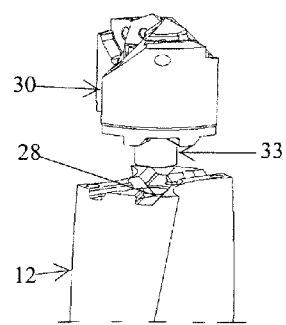
FIGS. 9a-9d show partial perspective views of the connection and assembly between the drill head and holder body of this example of the drilling system.
Figure 9B:
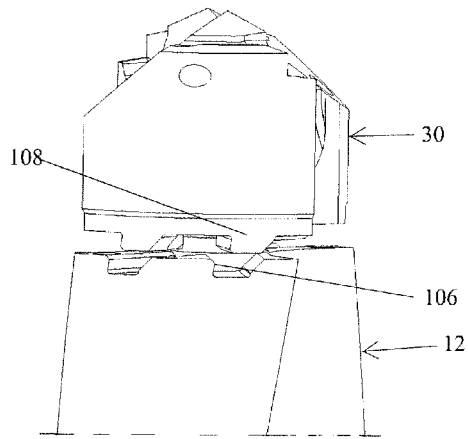
Figure 9C:
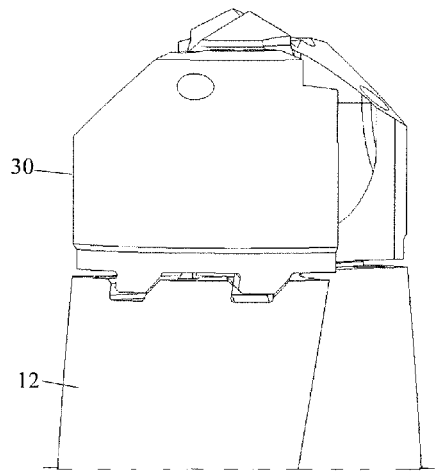
Figure 9D:
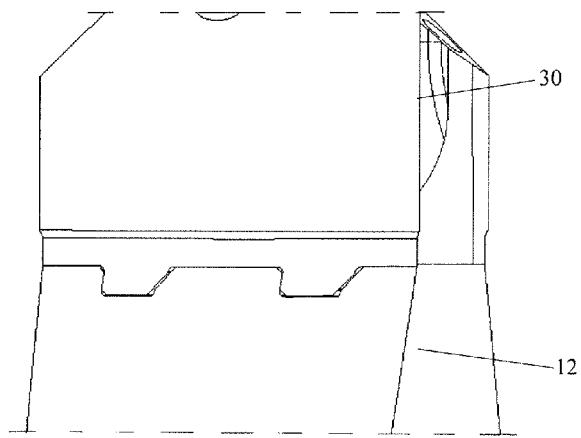

In this example, with reference to FIGS. 9a-9d, the dovetail protrusions 42 of the drill head 30 and the dovetail grooves 22 in the body 12 are formed in a rotational pattern about the center axis of the tool in a manner that first allows the drill head center guide post 33 to be inserted into the body center guide post hole 28 as seen in FIG. 9a. The drill head 30 may then be rotated about the axis of the center post 33, in the direction of tool rotation (clockwise), as seen in FIG. 9b. As the drill head 30 is rotated, the dovetail protrusions 42 of the drill head 30 engage with the dovetail grooves 22 on the body 12 as seen in FIG. 9c, and lock into place as in FIG. 9d.

In the example, the connection between the body 12 and drill head 30 provides further distinct advantage. In a drilling process, lateral drilling forces have led to the use of screws and/or an insertable post or boss to attempt to counteract such lateral loading. Also, attempts to prevent tipping or rocking of a drill head against a holder body from lateral loading due to drilling forces has included putting these screw and/or bosses in bending. In such attempts, the position of these features relative to the point on the drill head where lateral loading is introduced increases the bending moment. In contrast, the present invention provides a connection between the body 12 and drill head 30 which effectively handles the lateral loading differently. The engaged surfaces 106 and 108 (see FIG. 9b) of the dovetail grooves 22 and protrusions 42 may be oriented at angles, such as 2° to 30°, or for performance, 5° to 20°, with an angle of 10° shown in the example. The angled surfaces allow any and all components of lateral loading to be opposed by at least two of these features. The first function of the angled surfaces is to translate the torque from the tool into axial motion, drawing the drill head 30 onto the seating surface of the holder body 12. Their second function is that when the angled surfaces are engaged, it will prevent tipping or rocking of the drill head 30 on the holder body 12. In FIGS. 10a-10c, there is shown the engaged surfaces of the drill head 30 and holder body 12 as well as the dovetail features with lines at 110. The opposing arrows 112 in the main cross sectional view show how these dovetail features create an effective clamp on each of the features with which they are engaged, so as to positively hold the drill head 30 onto the mating surface of the holder body 12. Further, because these features are symmetrical they create the effect of opposing wedge shapes which would not allow any degrees of freedom once assembled.

The center guide post 25 of the drill head 30 inserts into the corresponding center guide post hole 15 in the body 12. This feature acts as a positional guide ensuring that, when assembled, the drill head 30 and the body 12 share the same axis of rotation within set tolerances, and allows for proper alignment of the dovetail grooves and dovetail protrusions.

As described above the center guide post 33 and the mounting screws 34 only act as a means of guiding the assembly of the drill head 30 to the holder body 12. The purpose of the mounting screws is to ensure proper assembly of the drill head and body. Once tightened in place the drill head and body will be assembled and ready to be used to drill. The mounting screws carry no load during drilling because all of the load is translated through the drill head and body interface. Once the dovetail surfaces are engaged, the influence of the mounting screws and guide post are negligible. This keeps the center post 33 and mounting screws 34 from being loaded in bending and concentrates all of the opposing lateral loads at the immediate connection 100 interface.

In this example, the drilling system may be designed to operate with through tool coolant. As seen in FIGS. 11a and 11b, the drill head 30 may include four outlets, including two inner outlets 120 designed to direct a supply of coolant to the central drilling system 70 and two outer outlets 122 designed to direct a supply of coolant to the major diameter cutting inserts 50. A large central coolant hole 124 formed in the holder body 12 will carry the coolant from the machine tool, through the body 12, and towards the drill head 30. In this example, as seen in FIG. 11c, the arrows show the coolant that supplies the two inner outlets 120 will travel through a main central coolant channel 124 formed in the body 12, which breaks out into the center guide post hole 26. From there, the coolant travels into the drill head 30 through a central channel 126 in the bottom of the center guide post 33. The two inner outlets 120 are angled to intersect this main channel 126 in the drill head 30 and release the coolant near the central drilling system 70. In FIG. 11d, the arrows show the coolant that supplies the two outer outlets 122 will travel through the main central coolant channel 124 of the holder body 12 towards the drill head 30. Two outlets 128 extend from the face of the body 12 and angle inward to intersect with the main coolant channel 124. The coolant will travel through these angled outlets 128 where they connect with the outer outlets 122 of the same diameter on the bottom seating surface of the drill head 30, such that the coolant is released near the outside diameter of the drill head 30 towards the major diameter cutting inserts 50. Other configurations to apply coolant at the locations of the cutting inserts 50 and 70 may be used.

The major diameter cutting inserts 50 may be indexable IC inserts, such as shown in FIGS. 12a and 12b. In this example, trigon inserts are shown, having three cutting edges, and include a wiper 150, being a feature on the insert 50 that is formed on the part of the insert cutting the major OD. The wiper 150 is generally positioned to be vertical in line with the center axis of the hole being drilled. The wiper surface has a small amount of clearance 152 behind the cutting edge as seen in FIG. 12b. The wiper 150 avoids the formation of surface defects from the cutting edge having a single point of contact between the tool and the work piece, such as if a corner radius is used instead of the wiper 150. A single point contact can result in visible grooves in the surface finish of the hole, but also will not act to stabilize the tool. The wiper 150 allows the drill system to form a finished hole configuration with improved surface finish of the work piece, especially at tool break out. Additionally, the wiper 150 will provide stability to the tool at the point where the center drill exits the work piece. In the example shown, when the inserts 30 are set in a double effective configuration, there will be a wiper 150 cutting the major diameter on two sides of the tool, such as 180° apart from each other. These opposing wipers 150 will act as a margin for the tool as it breaks out of the work piece on through holes. If the inserts 30 are set up in a single effective configuration, with only one wiper 150 on the insert cutting the major diameter, a wear pad can be used on the drill head 30 to oppose the wiper 150 and provide the stability for exit on through holes.

For the central drilling system 70, a self-centering point geometry, such as on the AMEC T-A® blade and Gen3sys® replaceable tip drill of Allied Machine & Engineering Corp., provide a combination of clearance features on the point of the blade that greatly increases its centering capability. The positive web cutting edge geometry allows for free mechanical chip forming at the drill center. These features benefit the design by producing a hole that starts on center and retains an overall increased straightness throughout the depth of the hole. This drilling system may utilize either of these two as the central drilling system, or another suitable system.

The design of the system 10 allows for a greater amount of drill diameter range with each holder body 12 as well as having the flexibility of tailoring the central drilling system 40 geometry to the application. The connection between the drill head 30 and holder body 12 also provides a structurally robust design that offers superior stability to the drilling head 30 during a drilling operation. Any volatility experienced in the drilling environment is handled by the connection between the drill head 30 and holder body 12, and the stability of the drill head 30 in the present invention results in the cutting inserts 50 and 70 being supported to result in increased tool life and better hole quality. The connection between the body 12 and drill head 30 is also cost-effectively manufactured and makes assembly simple.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A drilling system for producing deep holes in a workpiece, comprising:
   a holder body having an outer diameter;
   a drill head having an outer diameter attachable to the holder body, with the holder body having a first mating surface, and the drill head having a second mating surface that engages the first mating surface of the holder body when attached thereto, the drill head having at least one cutting insert attached thereto;
   the first and second mating surfaces including one of the at least one dovetail protrusion formed to extend to the outer diameter of the mating surface and the at least one dovetail groove formed to extend to the outer diameter of the mating surface, with the at least one protrusion or groove formed on opposing first and second mating surface, and wherein the drill head is assembled to the holder body by rotating the drill head relative to the holder body about the axis of the tool until the at least one dovetail protrusion engages with the at least one dovetail groove to the outer diameter and locks the drill head into place in association with the holder body, the drill head having at least one aperture from the top of the drill head to the second mating surface, and at least one fastener extending through the at least one aperture and fastened to the holder body, wherein upon assembly of the drill head to the holder body, the at least one fastener carries substantially no load during drilling.

2. The drilling system of claim 1, wherein a plurality of dovetail grooves and dovetail protrusions are provided on the respective mating surfaces.

3. The drilling system of claim 2, wherein the plurality of dovetail grooves and dovetail protrusions are symmetrically positioned on opposing sides of the center of each mating surface.

4. The drilling system of claim 2, wherein the dovetail protrusions and the dovetail grooves are formed to extend from adjacent the center axis of the mating surface to the outer diameter thereof.

5. The drilling system of claim 2, wherein the plurality of dovetail protrusions and dovetail grooves allow for the drilling head to be assembled to the holder body at predetermined increments.

6. The drilling system of claim 1, further comprising a guide post on one of the holder body and drill head and a guide post aperture on the other of the holder body and drill head, wherein assembly of the drill head to the holder body includes insertion of the guide post into the guide post aperture, and wherein upon assembly of the holder body on the drill head, the guide post carries substantially no load during drilling.

7. The drilling system of claim 6, wherein the holder body has a coolant hole along the central axis thereof and the guide post has a corresponding coolant hole therethrough and extending to the top of the drill head.

8. The drilling system of claim 1, wherein the at least one dovetail protrusion and at least one dovetail groove include angled surfaces which engage one another from adjacent the center of the mating surface to the outer diameter of the mating surfaces.

9. The drilling system of claim 8, wherein the engaged surfaces are angled from between 2° to 30°, and wherein the angled surface translate the torque from drilling to draw the drill head onto the mating surface of the holder body.

10. The drilling system of claim 8, wherein the engaged surfaces substantially prevent tipping or rocking of the drill head on the holder body.

11. The drilling system of claim 1, further comprising at least two cutting inserts set in a double effective configuration.

12. The drilling system of claim 1, wherein a plurality of dovetail grooves and dovetail protrusions are formed symmetrically on opposing sides of the center of the mating surfaces to create the effect of opposing wedge shapes which substantially prevent any degrees of freedom of motion between the drill head and holder body.

13. The drilling system of claim 1, further comprising at least one central drilling system and at least one outboard cutting insert for cutting the major diameter of a hole, and a through tool coolant system including at least one inner outlet positioned to direct a supply of coolant to the central drilling system at least one outer outlet positioned to direct a supply of coolant to the at least one outboard cutting insert.

14. The drilling system of claim 13, wherein a plurality of cutting inserts are provided for cutting the major diameter of a hole, and an outer outlet directs a supply of coolant to each of the cutting inserts.

15. The drilling system of claim 1, further comprising at least one central drilling system and at least one outboard cutting insert for cutting the major diameter of a hole, wherein the at least one cutting insert includes a cutting edge including a wiper formed on the part of the insert cutting the major diameter and positioned to be substantially vertical in line with the center axis of the hole being drilled.

16. The drilling system of claim 15, wherein the wiper surface has a small amount of clearance behind the cutting edge.

17. A drilling system for producing holes in a workpiece, comprising:
   a holder body;
   a drill head attachable to the holder body, with the holder body having a first mating surface, and the drill head having a second mating surface that engages the first mating surface of the holder body when attached thereto;
   at least one pair of dovetail protrusion and corresponding dovetail groove, with the at least one pair protrusion or grooves formed on one of the first and second mating surfaces and extending from adjacent the center axis of the mating surfaces to the outer diameter of the mating surfaces on opposing sides of the center axis of each mating surface and in co-linear relationship to one another on each of the mating surfaces.

18. The drilling system of claim 17, further comprising mounting screws to fasten the drill head to the holder body, and wherein after assembly of the drill head to the holder body, the mounting screws carry no load during drilling.

19. The drilling system of claim 17, wherein a plurality of pairs of dovetail grooves and dovetail protrusions are provided on the respective mating surfaces.

20. A process of assembling a drilling system, comprising
   providing a holder body and a drill head attachable to the holder body, with the holder body and the drill head having mating surfaces that engage one another, each of the holder body and drill head having of at least a pair of dovetail protrusion or corresponding dovetail groove formed on one of the mating surfaces and extending from adjacent the center of the mating surface to the outer diameter of the holder body and drill head respectively on opposing sides of the center axis of each mating surface and in co-linear relationship to one another on each of the mating surfaces,
   positioning the mating surfaces adjacent one another and rotating the holder body relative to the drill head until angled surfaces on the at least pair of dovetail protrusions engage with the angled surfaces on the at least pair of dovetail grooves to lock the drill head into place in association with the holder body.

* * * * *

UNITED STATES PATENT AND TRADEMARK OFFICE
CERTIFICATE OF CORRECTION

PATENT NO.          : 9,498,829 B2
APPLICATION NO.     : 13/787338
DATED               : November 22, 2016
INVENTOR(S)         : Jared R. Zabrosky It is certified that error appears in the above-identified patent and that said Letters Patent is hereby corrected as shown below:

In the Claims

Column 7 Line 15 In Claim 1 should read: "with the at least one protrusion or groove formed on opposing first and second mating surfaces".

Column 7 Line 59 In Claim 8 should read: "adjacent the center of the mating surfaces".

Column 7 Line 63 In Claim 9 should read: "and wherein the angled surfaces".

Column 8 Line 25 In Claim 15 should read: "a wiper on the part of the insert".

Column 8 Line 39 In Claim 17 should read: "at least one pair of dovetail protrusions and corresponding dovetail grooves, with the at least pair protrusions or grooves".

Column 8 Line 59 In Claim 20 should read: "having of at least a pair of dovetail protrusions or corresponding dovetail grooves".

Signed and Sealed this
Fourteenth Day of February, 2017

Michelle K. Lee
*Director of the United States Patent and Trademark Office*